United States Patent

Schumacher

[11] Patent Number: 5,816,534
[45] Date of Patent: Oct. 6, 1998

[54] AIRCRAFT CABIN DIVIDER ARRANGEMENT

[75] Inventor: Markus Schumacher, Buxtehude, Germany

[73] Assignee: Daimler-Benz Aerospace Airbus GmbH, Hamburg, Germany

[21] Appl. No.: 683,805

[22] Filed: Jul. 18, 1996

[30] Foreign Application Priority Data

Jul. 20, 1995 [DE] Germany .................. 195 26 525.4

[51] Int. Cl.⁶ .............................................. B64C 1/06
[52] U.S. Cl. ................................ 244/119; 244/118.5
[58] Field of Search ........................... 244/117 R, 119, 244/118.1, 118.5, 121; 410/129–135, 150

[56] References Cited

U.S. PATENT DOCUMENTS

| | | | |
|---|---|---|---|
| 2,752,864 | 7/1956 | Mcdougal, Sr. et al. | 410/130 |
| 3,712,663 | 1/1973 | Laven | 410/133 |
| 4,121,790 | 10/1978 | Graham | 244/118.5 |
| 4,185,799 | 1/1980 | Richards, Jr. | 410/130 |
| 4,597,549 | 7/1986 | Ryan | 244/118.5 |
| 4,639,031 | 1/1987 | Truckenbrodt | 410/130 |
| 4,899,962 | 2/1990 | Mueller | 244/118.1 |

FOREIGN PATENT DOCUMENTS

| | | | |
|---|---|---|---|
| 3917206 | 5/1989 | Germany | 244/118.5 |
| 4 119623 | 10/1992 | Germany . | |

*Primary Examiner*—Galen L. Barefoot
*Attorney, Agent, or Firm*—W. F. Fasse; W. G. Fasse

[57] ABSTRACT

An arrangement for dividing an aircraft cabin that extends perpendicular to the longitudinal direction of the cabin, includes a divider wall that is guided in a position adjustable manner in guide tracks that are arranged stationarily fixed along the aircraft cabin. The divider wall includes a plurality of individual divider elements. Each divider element is held slidably by corresponding support members in at least one guide track. Each guide track is arranged in the area of joints between cabin interior components. With this arrangement, running grooves, scratches, and lubricant smears on visible furnishings or fitting in the interior of the aircraft cabin can be avoided. The cost and effort for cleaning and maintaining the aircraft cabin are thus significantly reduced. The arrangement does not restrict the open or clear cross section of the cabin, particularly in the head room area, thereby reducing a source of danger to passengers.

17 Claims, 3 Drawing Sheets

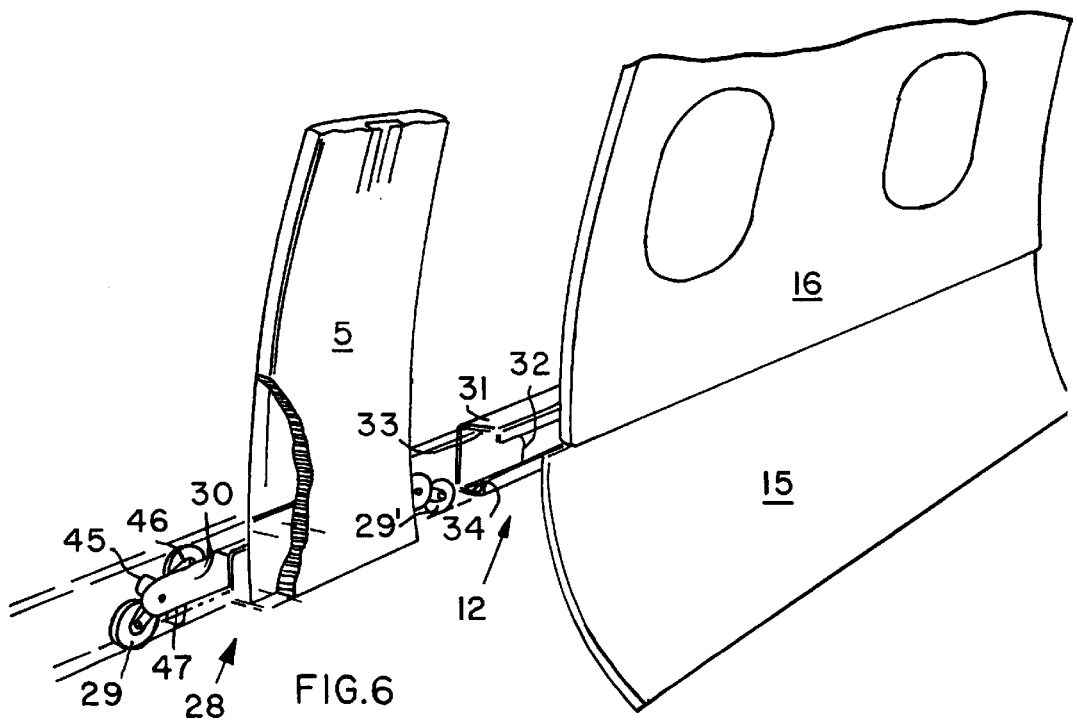
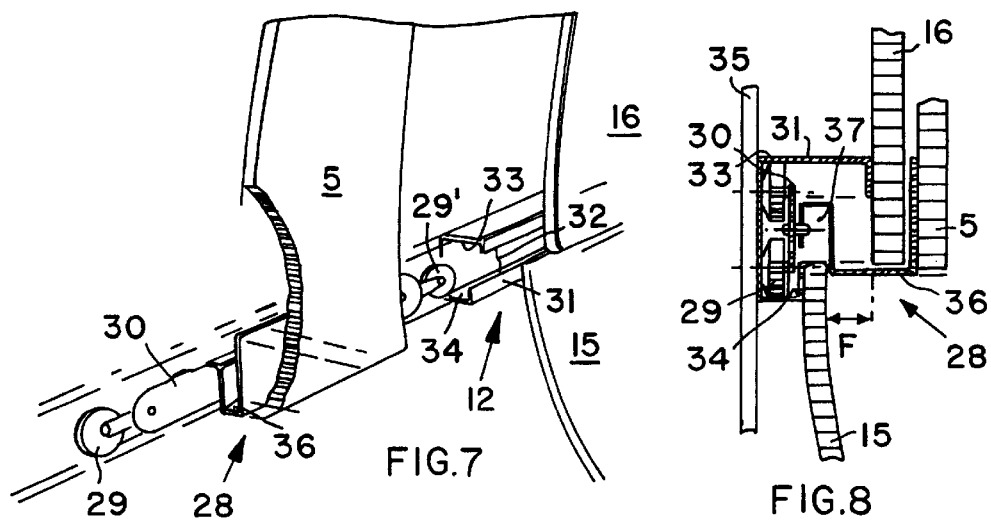

AIRCRAFT CABIN DIVIDER ARRANGEMENT

FIELD OF THE INVENTION

The invention relates to an arrangement for dividing or partitioning an aircraft cabin. The cabin divider arrangement extends across the aircraft cabin perpendicularly to a longitudinal direction of the cabin. The arrangement includes a divider wall that is carried on a support member that is slidably arranged in stationary guide tracks that are arranged along the aircraft cabin, so that the position of the divider wall can be changed or adjusted in the longitudinal direction of the aircraft cabin.

BACKGROUND OF THE INVENTION

Such divider arrangements, which are known as so-called class dividers, are arranged between groups of seats and are used to divide or partition the interior space of the aircraft cabin into the various travel classes. Furthermore, such arrangements can be used for separating the aircraft cabin into non-smoking and smoking areas. Since the number of required seats for the respective seating group is often known only shortly before takeoff, an economically favorable utilization of the aircraft requires that the cabin can be divided into the various seating groups within the shortest possible time and with little effort.

In the above context, German Patent 4,119,623 describes an arrangement for dividing aircraft cabins, which allows the position of the arrangement to be changed on short notice. Stationary guide tracks serve for guiding the known divider arrangement, whereby the guide tracks are constructed essentially as handrails that are arranged in easily accessible locations beneath overhead luggage compartments. However, after the position of the arrangement, which is constructed as a divider element, has been changed a number of times, the problem arises that the handrails exhibit scratches, running grooves, and lubricant smears as a result of the motion of the divider element by means of a roller carriage running along the rails. This detracts substantially from the visual appearance of the cabin. Thus, an increased effort in cleaning the handrails is required to remove the lubricant smears, and maintenance costs are increased if interior furnishings must be renewed because of scratches.

Furthermore, since the known mounting bracket or support element for the divider element must be curved inward into the aisle in the area around an overhead luggage compartment to allow the compartment door to be opened, it is to be expected that the cross sectional area of the passage, particularly in the head room area, is reduced. Moreover, if these mounting brackets are then covered up by a curtain, they present a hidden obstruction and thus a potential risk of accidents, particularly when the passengers are boarding or deplaning the aircraft.

OBJECTS OF THE INVENTION

In view of the above it is the aim of the invention to achieve the following objects singly or in combination:

- to embody a divider arrangement of the general type described above in such a manner that it will not detract substantially from the visual appearance of the aircraft cabin;
- to prevent scratches, running grooves, and lubricant smears on visible furnishings or fittings such as handrails in such a divider arrangement, so as to reduce cleaning and maintenance costs and efforts;
- to arrange the fittings and components of such a divider arrangement in the aircraft cabin so as to avoid restricting the open cross section of the cabin, particularly in the head room area of the aisle, and thus to improve the safety of the passengers;
- to provide an especially simple, robust and lightweight construction of such a divider arrangement;
- to achieve particularly easy handling, adjustability and adaptability of such a divider arrangement for a broad range of cabin configurations; and
- to increase the efficiency and ease of handling of other interior cabin furnishings and fittings that also slide longitudinally in the aircraft cabin by providing a guide track that will accommodate such furnishings.

SUMMARY OF THE INVENTION

The above objects have been achieved in a divider arrangement according to the present invention, wherein the divider wall comprises several individual divider elements, whereby each divider element is supported by an associated mounting fixture or support member that is guided slidably in at least one guide track to slide in the longitudinal direction of the aircraft cabin. Each guide track is arranged in the area of recesses or joints that are formed between adjacent components on the wall or ceiling of the aircraft cabin.

It is a particular advantage of the invention that running grooves, scratches, or lubricant smears are prevented on visible interior furnishings or fittings such as handrails, thereby significantly reducing the costs and efforts of cleaning and maintaining the aircraft cabin. A detraction in the visual appearance of the cabin is avoided and the passengers cannot get dirty from smeared furnishings or fittings such as a handrail. Furthermore, the arrangement of the invention ensures that the open or clear cross section of the aircraft cabin is not restricted, particularly in the area of the head room in the aisle, thus avoiding potential sources of danger for the passengers.

In a preferred embodiment of the invention, the divider wall comprises at least one divider element in the aisle area and at least one divider element in the seating area. This achieves the advantage that several separate divider elements can be variably arranged to accommodate different cabin configurations. For example, in an aircraft cabin with a center longitudinal aisle and a respective seating group along each window side, three divider elements are to be provided. Analogously, five divider elements are to be provided in an aircraft cabin having two longitudinal aisles.

In a further preferred embodiment, the contour of the support members is matched to the corresponding contour of the cabin wall or ceiling. The support member for a seating area may include a substantially flat lower curved arm along the wall, and a substantially flat upper curved arm yieldably arranged below the overhead luggage compartments. The support member for an aisle area may be a flat member fitted to the ceiling contour and slidably arranged in at least one guide track provided in a joint of the ceiling panels. With these arrangements, it is possible to avoid unnecessarily restricting the open clear cross section of the cabin of the aircraft when the divider wall curtains are open, and thus it is possible to satisfy the direct view requirement during take-off and landing phases.

A further embodiment provides a reliable mounting mechanism for the divider elements, by providing guide elements on the support members to cooperate with the guide tracks. Brake or lock mechanisms can be provided on the guide elements to secure the divider elements against unintentional changes in position. The guide elements may be constructed as a roller carriage or as a slide shoe, which ensures that the support member slides easily.

In a further embodiment of the invention, the guide track is a hollow profile track with rolling surfaces in an internal space thereof. This embodiment ensures simple handling when a guide element, which is embodied as a roller carriage, is installed in or removed from the guide track. Still another advantage is achieved in the easy running of the guide elements in the guide track.

A further advantage of the invention is achieved by simultaneously mounting the divider elements and cabin panel components on the same guide track. The guide track preferably runs longitudinally along the cabin in a joint between panel components. This particularly minimizes assembly work and allows such an arrangement that hides the guide tracks from the passengers' view.

In a preferred embodiment, the support and mounting members are constructed as lightweight composite panels or plate elements, which achieves a lightweight construction that is particularly important in aircraft construction.

BRIEF DESCRIPTION OF THE DRAWINGS

In order that the invention may be clearly understood, it will now be described by way of example embodiments, with reference to the drawings, wherein:

FIGS. 6 & 7 are enlarged perspective views of a guide roller carriage assembled in a corresponding guide track, respectively showing the pairs of rollers in the operating position (FIG. 6) and in the assembly position (FIG. 7); and FIG. 8 is a cross section through a guide track into which a guide roller carriage has been inserted, with the guide track arranged in the area of the cabin wall panels.

DETAILED DESCRIPTION OF PREFERRED EXAMPLE EMBODIMENTS AND OF THE BEST MODE OF INVENTION

Figure 1:
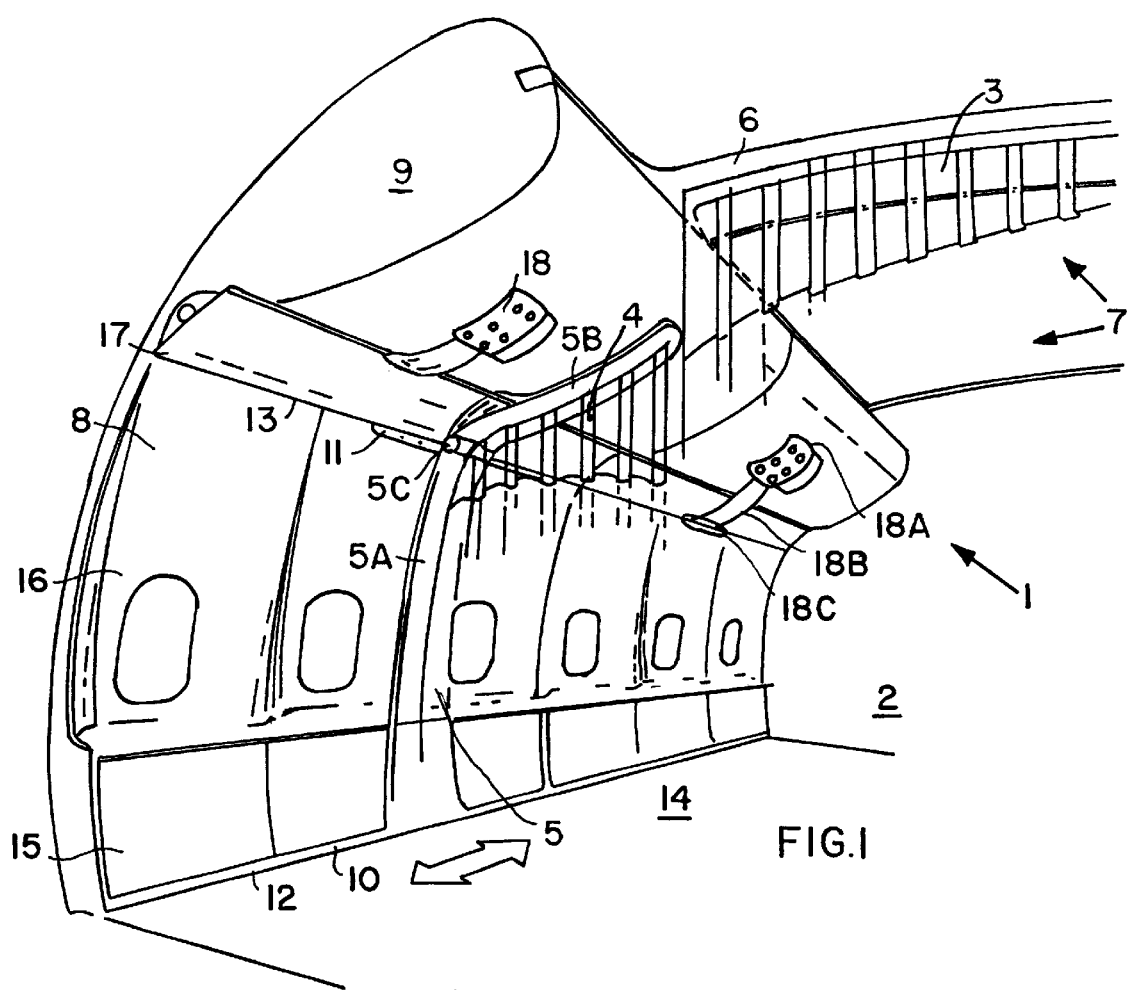
FIG. 1 is a perspective view of an aircraft cabin with a divider wall comprising several divider elements.

FIG. 1 shows a partial view of an aircraft cabin 2. Arranged therein is an aircraft cabin divider arrangement 1 that extends perpendicular to the longitudinal direction of the aircraft cabin 2. Thus, the aircraft cabin 2 can be subdivided into different areas, for example, into smoking and non-smoking areas, or different classes. The cabin divider arrangement 1 is embodied as a divider wall 7 and essentially comprises several separate divider elements 3, 4 that are individually slidable in the longitudinal direction of the aircraft. The divider elements 3, 4 may simply be embodied as divider curtains, for example, or may comprise rigid or semi-rigid panel elements in some situations.

An aisle area divider element 3 is arranged in the aisle area and a seating area divider element 4 is arranged in the seating area. By separating the divider wall 7 into the several divider elements 3, 4, it is possible to variably accommodate different cabin configurations. To close-off the view through an entire cross section of an aircraft cabin 2 having one aisle area and a respective seating group along each window side, three divider elements are provided, i.e. one aisle area divider element 3 and two seating area divider elements 4.

Longitudinally slidable seating area support member 5 and aisle area support member 6 are provided to hold the corresponding divider element 4 or 3, respectively, at a predetermined position inside the aircraft cabin 2. The seating area support member 5 and the aisle area support member 6 are arranged to be slidable in corresponding guide tracks 12, 13, 21 and 22. The support members 5 and 6 have a substantially flat cross section that lies closely along the adjacent cabin interior components. The support members 5 and 6 extend in directions perpendicular to the longitudinal direction of the aircraft cabin 2. The lengthwise extension of the support members 5 and 6 is formed or shaped to conform to the contours of the corresponding seating area or aisle area cross section of the aircraft cabin 2. Consequently, the open or clear cross section of the cabin is not restricted with unnecessary furnishings or fittings. Particularly in the aisle area, the present arrangement provides sufficient clearance for freedom of movement of the passengers and for the direct view requirements during take-off and landing. Preferably, support members 5 and 6 are constructed as lightweight composite or sandwich elements that can be formed to closely follow the contours of the aircraft cabin wall, ceiling panel elements or the bottom of the overhead luggage compartments.

The seating area support member 5 is constructed as a curved flat component including a lower curved arm 5A that runs along the area of a cabin side wall 8 and an upper curved arm 5B that extends from the lower curved arm 5A and runs beneath an overhead luggage compartment 9. The lower curved arm 5A of the flat support member 5 is slidably fixed by a lower guide element 10 in a lower guide track 12 and by an upper guide element 11 in an upper guide track 13.

The guide tracks 12 and 13 are arranged stationary or fixed in the aircraft cabin 2 and run along the joint recesses between cabin interior panel elements. The guide tracks 12 and 13 are preferably fastened to the fuselage structure 35 of the aircraft to achieve sufficient stability of the seating area support member 5. The lower guide track 12 is arranged in the area between the floor 14 and a lower wall panel 15. The upper guide track 13 is preferably arranged in the area between a window panel 16 and a lateral lighting fixture cover element 17. Preferably, the guide tracks 12 and 13 are covered by the cabin interior panels in such a manner that they are not visible to the passengers, and at least are not accessible to the passengers. In this way, the guide tracks 12 and 13 do not detract from the visual appearance of the cabin and the passengers will not get dirty from furnishings or fittings such as handrails.

Figure 2:
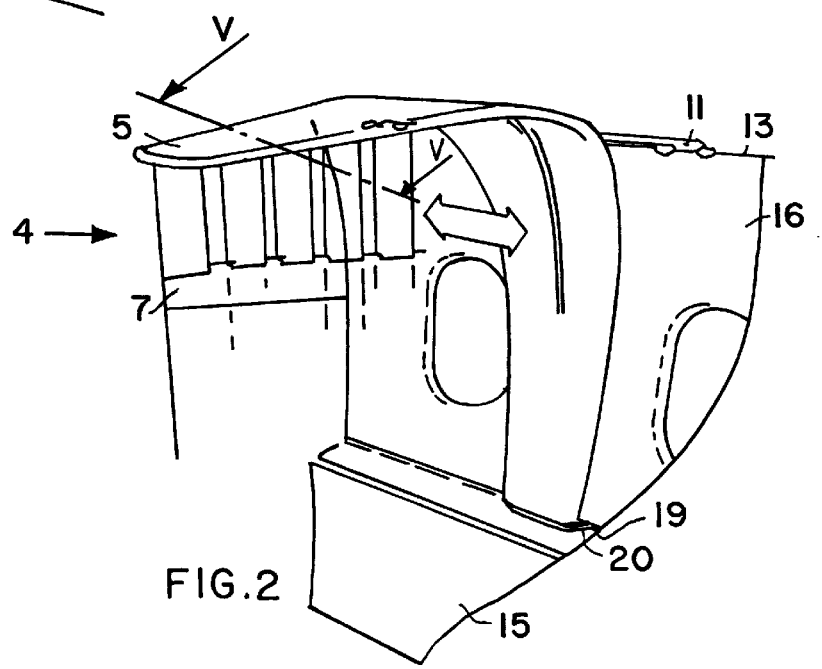
FIG. 2 is a perspective view of an embodiment of a seating area divider element with a slide shoe at its lower end.

As shown in FIGS. 6 to 8, the guide elements 10 and 11 can be respectively embodied as a guide roller carriage 28 that is guided in the respective guide track 12 and 13. Although FIGS. 6 to 8 only show a roller carriage 28 in the lower guide track 12, it should be understood that the upper guide element 11 and the upper guide track 13 can be constructed in a similar fashion. It is also conceivable that only the upper guide track 13 is constructed to receive a guide element 11 in the form of a longitudinally slidable guide roller carriage, while the lower guide track 12 is constructed simply as a sliding surface 19 for contacting or cooperating with the lower guide element 10 that is simply in the form of a slide shoe 20, as shown in FIG. 2.

Furthermore, it is also possible to arrange other furnishings or fittings that are to be longitudinally slidable within the cabin so that they can be guided within the same guide track. For example, FIG. 1 shows two possible arrangements of a passenger service module 18 and 18A under the overhead luggage compartment 9. The service module 18 is arranged independently of the upper guide track 13, while the service module 18A is slidably arranged in the track 13. Namely, a guide element 18C at the end of a support arm 18B of the module 18A is engaged in the track 13 so that the module 18A is slidably movable along the track 13. Other components may be similarly engaged in the guide tracks.

In a further embodiment that is merely schematically shown in FIG. 6, it is also conceivable that the divider elements 3, 4 can be moved automatically in the guide tracks, without requiring manual operation. A drive mechanism is required for this, for example, an electric motor 45 with a drive train 46, which is preferably provided for each respective guide roller carriage 28 and is controlled from a central control station.

Any type of stop or lock mechanism or brake device that is known per se can be provided on the roller carriage 28 as indicated schematically at 47 in FIG. 6, so as to selectively lock or fix the roller carriage 28 in the guide track 12 or other guide tracks at a predetermined position and then to selectively release it again. Thereby it is a simple matter to handle and adjust the divider elements when changing the position of the divider wall 7.

FIGS. 1 and 2 further show that the upper curved arm 5B of the seating area support member 5 is not guided in an additional guide track, but that instead, it extends as a cantilevered beam along the bottom of the overhead luggage compartment 9 toward the center of the cabin. The cantilevered beam 5B of the seating area support member 5 must extend far enough toward the center of the cabin to ensure that the divider wall 7, which is substantially embodied as a curtain, achieves a complete separation or dividing of the aircraft cabin 2 in the seating area.

Since the upper curved arm 5B of the seating area support member 5 is constructed as a cantilevered beam, it can deflect or yield to a certain extent in the vertical direction. Thus, when it is necessary to change the position of the divider elements 3 and 4, it is possible to deflect the upper curved arm 5B of the support member 5 downward so that it can pass under and slide past furnishings or accessories, such as the passenger service modules 18, that are arranged beneath the overhead luggage compartment 9. Furthermore, the cantilevered beam 5B yields or deflects when the bin or flap door of the overhead luggage compartment 9 is opened downward, and returns to its initial position when the bin or door is closed. To enhance this yielding character of the upper arm 5B, it may optionally be connected to the lower arm 5A by a strongly spring-loaded hinge joint 5C as schematically shown in FIG. 1.

Figure 3:
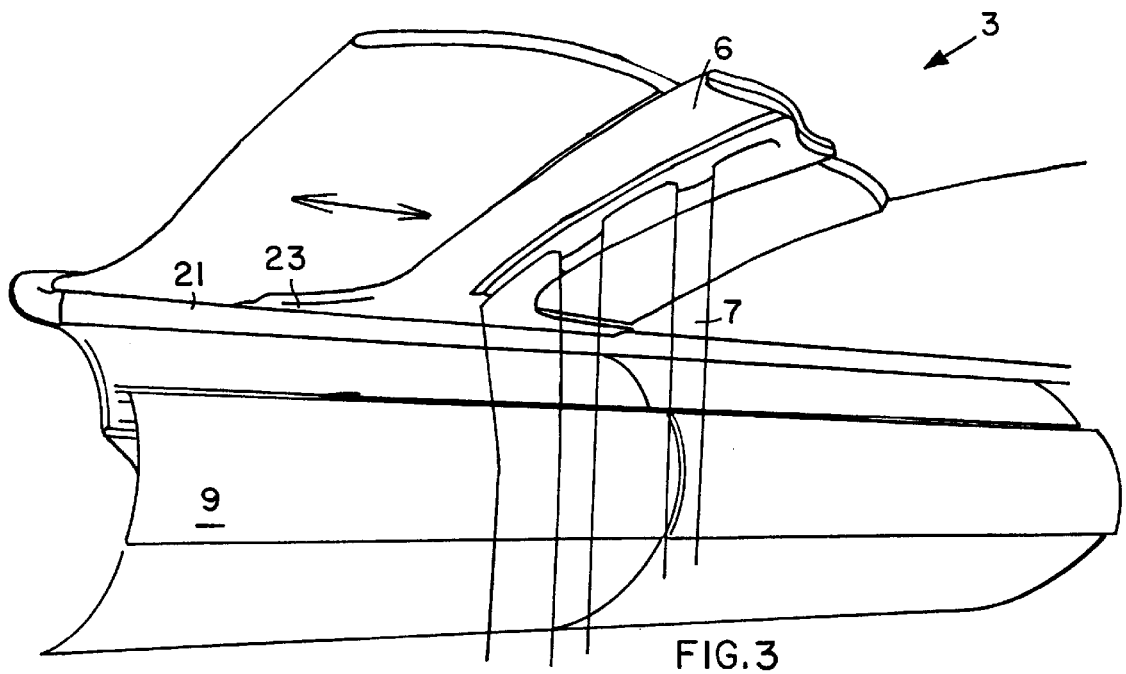
FIG. 3 is a perspective partial view of an aisle area divider element.
Figure 4:
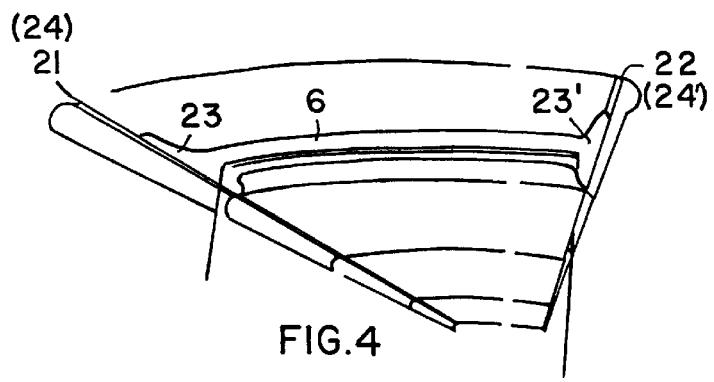
FIG. 4 is a perspective view of an aisle area support member.

The aisle area divider element 3, which comprises the aisle area support member 6 and a curtain 7, is shown in FIGS. 3 and 4. In a preferred embodiment, the aisle area support member 6, like the seating area support member 5 described above, is constructed as a flat component, preferably in a lightweight composite sandwich construction, that is shaped to conform to the ceiling contour of the aircraft cabin 2. The support member 6 extends across the entire aisle, thereby ensuring that the curtain 7 can be so arranged to completely close off the view through this area. The curtain 7 in the aisle area easily moves aside when the flap door or bin of the adjacent overhead luggage compartment 9 is opened. This means that it is no longer necessary to provide for the curtain 7 an additional aisle area support member that is curved or notched to make space for an open flap door of the overhead luggage compartment 9.

In one embodiment, as shown in FIG. 4, the aisle area support member 6 is provided with a left guide element 23 and a right guide element 23' that are respectively received and guided in a left ceiling guide track 21 and a right ceiling guide track 22, which are respectively arranged in the area of joint recesses 24 or 24', i.e. in spaces formed between lighting cover elements and ceiling panel elements or between adjacent ceiling panel elements. Preferably the ceiling guide tracks 21 and 22 are connected to the fuselage structure 35 of the aircraft to provide a sufficient stability for the aisle area support member 6. Also for purposes of stability, the guide elements 23 and 23', which are constructed as guide roller carriages, are made sufficiently long to thereby reduce the danger of the support member 6 canting in the ceiling guide tracks 21 and 22. The body of the aisle area support member 6 is widened or flared outward in the area of the transition to the guide elements 23 and 23' to cover up the guide elements for a clean visual appearance.

Figure 5:
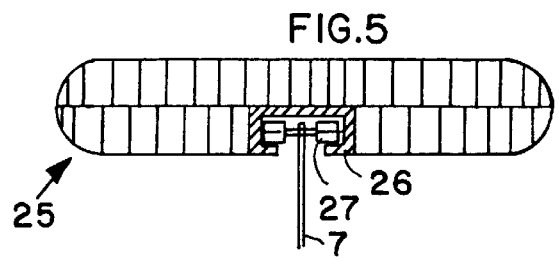
FIG. 5 is a cross section through a divider element in the direction of view V—V in FIG. 2.

FIG. 5 shows a cross section through the divider element 3 in the direction of view V—V in FIG. 2, in order to illustrate the construction of the support member 5 or 6 as a flat component. To obtain a flat construction that still fulfills the requirements for high strength and low weight, a lightweight composite material having a honeycomb core or carbon fiber structure 25 can be used. FIG. 5 shows an embodiment comprising two layers into which a curtain track 26 has been embedded. The curtain track 26 can be made of typical aluminum profiles which are glued or cemented into the lightweight composite panel and, like the flat component, can also be formed to closely follow the contour of the aircraft cabin 2. The curtain 7 is movably supported by glide elements such as sliders or guide rollers 27 inside the curtain track 26. To obtain the required direct view during the take-off and landing phases, the curtain 7 is simply pushed aside.

An enlarged perspective view of a guide track 12 in which a guide 20 roller carriage 28 has been installed is shown in FIGS. 6 and 7, with the roller carriage 28 respectively in an operating position and an installation position. The guide track 12 is arranged behind the window panel 16 and the lower wall panel 15 and is thus not visible to a passenger. The roller carriage 28 essentially comprises two pairs of rollers 29, 29' that are connected to each other by a connecting member 30. One pair of rollers 29, 29' is fastened rotatably to each end of the connecting member 30. The roller carriage 28 can be brought into the assembly or installation position shown in FIG. 7 by aligning the roller pairs 29, 29' horizontally, i.e. aligned with the length dimension of the connecting member 30, whereby the support member 5 can be removed from or installed in the guide track 12. The spacing distance between the pairs of rollers 29, 29' is selected sufficiently large to ensure that the seating area support member 5 does not cant or tilt.

In the construction shown, the guide track 12 is constructed preferably as an open or hollow rectangular profile 31 with an access area 32 into the inner space of the profile 31 that is sufficiently large to allow the pairs of rollers 29, 29' to be removed from or installed in the inner space of the profile track 31 without difficulty in the above described manner. The inner space of the profile 31 has rolling surfaces 33, 34 for the pairs of rollers 29, 29' that are provided on the roller carriage 28.

FIG. 8 shows a cross section through the profile track 31 that is arranged in the area of the cabin panelling, with a roller carriage 28 inserted in the track 31. The profile track 31 is attached to the fuselage structure 35 of the aircraft, to provide the track with a stationary and stable position. Simultaneously, the profile track 31 serves as a mounting for furnishings or fittings within the aircraft cabin 2. Thus, the lower wall panel 15 is attached to the lower web or shank of the rectangular profile 31, and the window panel 16 is attached to the upper web or shank of the rectangular profile 31. A recess or joint gap F is formed between the window panel 16 and the lower wall panel 15. The joint gap simultaneously provides sufficient space for the roller carriage 28 to roll along the rectangular track 31. The roller carriage 28 essentially comprises the previously mentioned pairs of rollers 29, 29', a connecting member 30 between the rollers 29, 29', as well as a mounting bracket 36 for connecting the roller carriage 28 with the seating area support member 5. The support member 5, which is constructed as a lightweight element, is attached to the mounting bracket 36 with any desired conventional means. The mounting bracket 36 is substantially U-shaped and preferably has a recess 37 for mounting the lower wall panel 15.

Although the invention has been described with reference to specific example embodiments, it will be appreciated that it is intended to cover all modifications and equivalents within the scope of the appended claims.

What is claimed is:

1. An arrangement for dividing an interior space in an aircraft cabin that is bounded by cabin components including wall panels and ceiling panels, said arrangement comprising a plurality of guide tracks that extend in a longitudinal direction of said aircraft cabin and that are stationarily arranged along joints between adjacent ones of said cabin components, a plurality of divider support members respectively engaged with at least one of said guide tracks to be selectively slidable therealong, and a divider that is adapted to divide said interior space and that comprises a plurality of individual divider elements that are respectively connected to and supported by a corresponding one of said support members, wherein said aircraft cabin includes at least one aisle and at least one seating area beside said aisle, and said divider elements include an aisle area divider element arranged at said aisle and a seating area divider element arranged at said seating area, and wherein said aircraft cabin includes an overhead luggage compartment and a cabin side wall formed of said wall panels, at least one of said guide tracks is arranged along said cabin side wall, and at least one of said support members is a seating area support member that has a substantially flat cross section and that includes a lower curved arm that is engaged with said at least one guide track arranged along said cabin side wall and an upper curved arm that extends from said lower curved arm as a cantilevered beam beneath said overhead luggage compartment.

2. The arrangement of claim 1, wherein said divider extends substantially perpendicularly to said lengthwise direction of said aircraft cabin.

3. The arrangement of claim 1, wherein at least one of said support members comprises a lightweight composite panel construction.

4. The arrangement of claim 1, wherein said divider elements comprise respective curtains and glide elements that respectively slidably connect said curtains to said support members.

5. The arrangement of claim 1, wherein said upper curved arm is yieldingly deflectable to a limited extent in a vertical direction.

6. The arrangement of claim 1, wherein said seating area support member further comprises a spring-loaded hinge joint interposed between and connecting said upper curved arm and said lower curved arm.

7. The arrangement of claim 1, wherein said aircraft cabin includes a cabin ceiling formed of said ceiling panels above said aisle, at least one of said guide tracks is arranged along said ceiling in one of said joints, and at least one of said support members is an aisle area support member that has a substantially flat cross section and a shape following a contour of said cabin ceiling and that is engaged with said at least one guide track arranged along said ceiling.

8. The arrangement of claim 1, wherein said support members are independently selectively slidable along said guide tracks, so that said divider elements are independently position adjustable along said longitudinal direction of said cabin.

9. The arrangement of claim 1, wherein at least one of said support members has a shape that matches and smoothly follows a contour of at least one of said cabin components bounding said interior space.

10. The arrangement of claim 1, wherein said support members further comprise guide elements that engage said support members with said guide tracks.

11. The arrangement of claim 10, wherein said guide elements comprise selectable locking mechanisms that selectably lock said guide elements to said guide tracks.

12. The arrangement of claim 10, wherein said guide elements comprise roller carriages.

13. The arrangement of claim 12, wherein said roller carriages respectively comprise a carriage body, a roller, and a drive motor connected to said roller.

14. The arrangement of claim 10, wherein said guide elements comprise slide shoes.

15. The arrangement of claim 1, wherein at least one of said guide tracks comprises a hollow sectional rail with an access gap opening into an inner space within said rail, and with at least one running contact surface provided in said inner space.

16. The arrangement of claim 1, wherein at least one of said guide tracks comprises a rail member to which at least one of said cabin components is connected.

17. The arrangement of claim 1, wherein at least one of said guide tracks is arranged recessed within one of said joints so that at least one of said cabin components will cover said at least one guide track in such a manner that said at least one guide track will not be visible in a line of sight of a passenger in said cabin.

* * * * *